Figure 1:
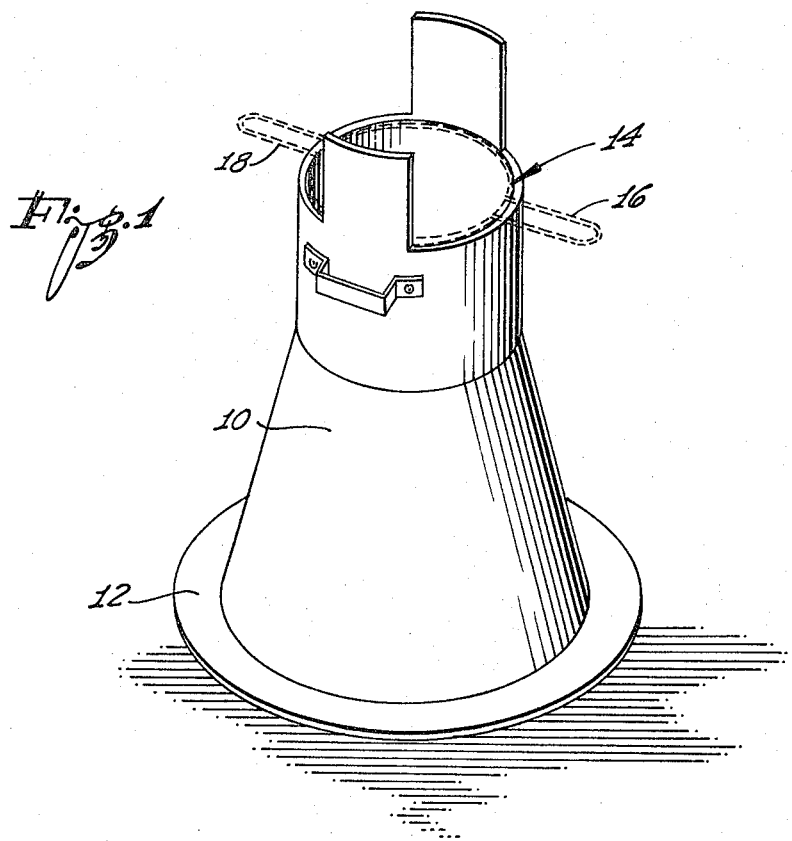

May 14, 1968 — J. KATZ — 3,382,863

FUEL SAVER

Filed Oct. 24, 1966

INVENTOR:
Jack Katz

By Keith D. Beecher
ATTORNEY

United States Patent Office 3,382,863
Patented May 14, 1968

3,382,863
FUEL SAVER
Jack Katz, 6630 W. Colgate Ave.,
Los Angeles, Calif. 90048
Filed Oct. 24, 1966, Ser. No. 588,964
5 Claims. (Cl. 126—242)

The present invention relates to an assembly for use in conjunction with barbecue grills, and the like, and which serves as a means for quenching and extinguishing partially burned solid fuel, such as charcoal, so that the fuel may be subsequently re-used.

It is common practice to empty the glowing coals of a barbecue grill, or the like, into a bucket, or other container of water, after the grill has been used to perform its cooking function. This permits the coals to be quenched so that they may be re-used on a subsequent occasion.

However, it has proven to be an awkward procedure, not only in transferring the burning coals from the barbecue grill, or pit, to the water bucket; but also in subsequently draining the water out of the bucket and drying the coals for subsequent re-use.

The present invention provides an assembly which includes a basket portion and a water-container portion. As will be described, the basket portion is supportable on the water container portion in two positions. In its first position, the basket portion extends down the open top into the water in the water container. In its second position, the basket is supported up from its first position, and is held above the water level in the container to permit the quenched coals to drain.

The burning coals from the grill, or the like, are shoveled, or otherwise placed in the basket portion of the assembly of the invention, with the basket portion positioned, for example, in its first (down) position. This causes the coals in the basket to be quenched by the water in the container.

After the coals have been extinguished by the water, the basket is moved to its second (up) position in the container, thereby permitting the coals to drain and be ready for subsequent use.

When the coals are to be re-used, it is a simple matter to remove the basket from the water container, to carry the basket to the grill, barbecue pit, or the like, and to empty the contents of the basket into the grill or pit.

It is, accordingly, an object of the present invention to provide a rugged and sturdy, inexpensive fuel saving assembly; in which glowing coals, and the like, may be easily and conveniently placed for quenching purposes; and by which the extinguished coals can conveniently be drained and subsequently returned to the grill, pit or the like, for re-use.

Although the assembly of the invention is described herein as used, for example, in conjunction with a barbecue pit or grill for extinguishing charcoal, it will be evident as the description proceeds, that the structure of the invention can be used for conveniently quenching a wide variety of solid fuels such as other coals, wood, or the like, and in conjunction with stoves, furnaces, fire pits, and so on.

Figure 2:
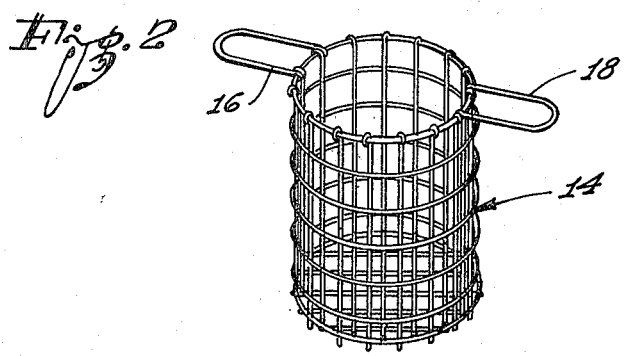

The features of the invention which are believed to be new are set forth with particularity in the claims. The invention itself, however, together with further objects and advantages thereof, may best be understood by reference to the following description, when the description is taken in conjunction with the accompanying drawing, in which:

FIGURE 1 is a perspective view of one embodiment of the assembly of the present invention; and FIGURE 2 is a perspective view of a basket-like receptacle portion which constitutes one of the components of the assembly of FIGURE 1.

The assembly illustrated in the accompanying drawing includes a container 10 which may be formed of metal, or any other appropriate material capable of holding a quenching fluid, such as water.

In the illustrated embodiment, the container 10 has a truncated conical configuration, with its lower diameter being larger than its upper diameter.

The lower end of the container 10 is closed by an appropriate bottom, and the bottom defines, for example, a lower flange 12. The bottom and flange serve to support the container firmly on the ground, for example, so as to provide a stable assembly. This flange, however, is an optional feature, and is not essential to the structure of the invention.

The upper end of the container 10 is open, and its upper rim is notched, as shown in FIGURE 1, so as to define a pair of diametrically opposed slots.

The assembly also includes a basket-like receptacle 14. The receptacle 14 has a pair of lugs 16 and 18 which extend out from its upper edge. The basket-like receptacle 14 is configured so that it may extend down through the open top of the container 10 and down into the interior of the container.

The basket-like receptacle 14 has two positions in which it is supported on the container. The first position is one in which the lugs 16 and 18 are supported by the bottoms of the diametrically opposed slots, so that the receptacle extends down into the interior of the container. When the receptacle is in its first (down) position, it extends into the water in the container. However, its bottom of the receptacle in its down position is still displaced up from the bottom of the container for good heat circulation, and so as to avoid burn-out of the components. The first position is shown in FIGURE 1.

When the basket-like receptacle 14 is in the down position described in the preceding paragraph, coals from the barbecue grill, or other furnace, fire pit or the like, may be shoveled or otherwise transferred into the basket-like receptacle, so as to be quenched by the water in the container.

To this end, one of the aforesaid lots may be made narrow, and the other broad. This will facilitate the shoveling of coal into the receptacle, and will prevent the burning coals from scattering. It will be appreciated, in either event, that the upper end of the container 10 provides a shield, which serves to prevent coals from spilling over the sides of the container, as they are shoveled into the basket-like receptacle 14.

After the coals have been quenched, the receptacle 14 may be lifted up in the container 10 and turned 90° to the angular orientation shown in FIGURE 1. In this latter angular position, the lugs 16 and 18 engage the upper rim of the container 10.

The receptacle 14 is now supported in its draining position, in which it is held up out of the water in the container. This permits the quenched coals to drain and dry.

Then, when it is desired to re-use the coals, it is a simple matter merely to lift the receptacle 14 up out of the container 10, and to carry it and its load of coals back to the grill, fire pit or the like.

It will be appreciated that the container 10 may have any appropriate shape, and does not necessarily have the flared truncated conical configuration shown in the drawing.

It will also be appreciated that the improved assembly of the invention may be constructed in a relatively inexpensive manner, so as to constitute a rugged and sturdy unit.

The unit of the invention is exceedingly simple to use, and it provides a convenient means for quenching coals, or other solid fuel, for subsequent re-use.

While a particular embodiment of the invention has been shown and described, modifications may be made. It is intended in the claims to cover all modifications which fall within the scope of the invention.

What is claimed is:

1. An assembly for extinguishing glowing coals, and the like, including: a container for holding an extinguishing fluid and having an open top; and a removable receptacle for the glowing coals supportable on said container in a first quenching position in which the receptacle extends down through said open top into the interior of said container and in a second draining position in which said receptacle is displaced up from said first position.

2. The assembly defined in claim 1 in which said container has a notched upper rim, and in which said receptacle includes projecting lugs configured to extend over and engage said upper rim to permit said receptacle to be supported thereby in each of its first and second positions as determined by the orientation of said receptacle with respect to said container.

3. The assembly defined in claim 2 in which said notched upper rim defines a pair of diametrically opposed slots, and in which said lugs are supported at the bottoms of said slots for the first position of said receptacle and on said upper rim for said second position thereof.

4. The assembly defined in claim 1 and in which said container has a flared configuration so that its bottom diameter is greater than its top diameter.

5. The assembly defined in claim 1 in which said receptacle has a basket-like configuration.

References Cited

UNITED STATES PATENTS

| 3,060,919 | 10/1962 | Shaw | 126—25 |
| 3,318,300 | 5/1967 | Witty | 126—25 |

FREDERICK KETTERER, *Primary Examiner.*